US010969468B2

(12) United States Patent
Colafrancesco et al.

(10) Patent No.: US 10,969,468 B2
(45) Date of Patent: Apr. 6, 2021

(54) RECURSIVE REAL TIME POSITIONING SYSTEM SETUP METHOD FOR IMMEDIATE CONVERGENCE OF FUNCTIONAL SYSTEM SETUP

(71) Applicant: 7hugs Labs SAS, Montrouge (FR)

(72) Inventors: Julien Colafrancesco, Paris (FR); Simon Tchedikian, Issy-les-moulineaux (FR); Nicolas Schodet, Antony (FR); Mickael Touillaud, San Francisco, CA (US)

(73) Assignee: 7hugs Labs SAS, Montrouge (FR)

( * ) Notice: Subject to any disclaimer, the term of this patent is extended or adjusted under 35 U.S.C. 154(b) by 268 days.

(21) Appl. No.: 16/049,097

(22) Filed: Jul. 30, 2018

(65) Prior Publication Data

US 2020/0033443 A1    Jan. 30, 2020

(51) Int. Cl.
*G01S 7/40* (2006.01)
*G01S 13/72* (2006.01)
*G01S 13/74* (2006.01)

(52) U.S. Cl.
CPC .............. *G01S 7/40* (2013.01); *G01S 7/4026* (2013.01); *G01S 13/72* (2013.01); *G01S 13/74* (2013.01)

(58) Field of Classification Search
CPC ......... H04L 12/24; G08B 29/00; G01C 25/00; G01C 17/38; G01C 21/00; H04W 4/02; G11B 21/02; G08C 19/12; G01R 35/00; G01S 7/40; G01S 7/4026; G01S 13/72; G01S 13/74
See application file for complete search history.

(56) References Cited

U.S. PATENT DOCUMENTS 7,451,549 B1  11/2008  Sodhi
7,643,939 B2   1/2010  Zeng
8,005,635 B2   8/2011  Lin
(Continued)

FOREIGN PATENT DOCUMENTS

EP      2631665 A2   8/2013
EP      3496286 A1   6/2019
WO   2018025740 A1   2/2018

OTHER PUBLICATIONS

International Search Report and Written Opinion dated Nov. 22, 2019 from International Application No. PCT/IB2019/056461 filed Jul. 30, 2019, 11 pages.
(Continued)

*Primary Examiner* — Peter M Bythrow
(74) *Attorney, Agent, or Firm* — Daylight Law, P.C.

(57) ABSTRACT

A recursive real time positioning system setup method for immediate convergence of functional system setup is disclosed. In one disclosed embodiment, a method for onboarding a set of positioning devices to a positioning system includes issuing a human-perceptible unconnected indicator from a first positioning device in the set of positioning devices. The method also includes detecting a connection using a wireless receiver on the first positioning device. The connection is between the first positioning device and a second positioning device in the set of positioning devices. The method also includes issuing, in direct and automatic response to the detecting of the connection, a human-perceptible connected indicator from the first positioning device.

30 Claims, 5 Drawing Sheets

(56) References Cited

U.S. PATENT DOCUMENTS

| | | | |
|---|---|---|---|
| 8,825,426 B2 | 9/2014 | Chowdhary | |
| 9,229,084 B2 | 1/2016 | Tu | |
| 9,849,376 B2 | 12/2017 | Wilson | |
| 9,885,574 B2 | 2/2018 | Moore | |
| 10,223,554 B2* | 3/2019 | Brandsma | G06K 7/01 |
| 2005/0094610 A1 | 5/2005 | De Clerq | |
| 2011/0025490 A1* | 2/2011 | Egawa | G08B 7/06 |
| | | | 340/514 |
| 2013/0225197 A1* | 8/2013 | McGregor | G01S 1/68 |
| | | | 455/456.1 |
| 2014/0233401 A1* | 8/2014 | Jiang | H04L 67/10 |
| | | | 370/250 |
| 2014/0365154 A1 | 12/2014 | Moore | |
| 2016/0343032 A1* | 11/2016 | DeWitt | G06Q 20/3224 |
| 2017/0278061 A1* | 9/2017 | Skaaksrud | H04W 4/029 |

OTHER PUBLICATIONS

International Preliminary Report on Patentability dated Feb. 11, 2021 from International Application No. PCT/IB2019/056461, 8 pages.

\* cited by examiner

RECURSIVE REAL TIME POSITIONING SYSTEM SETUP METHOD FOR IMMEDIATE CONVERGENCE OF FUNCTIONAL SYSTEM SETUP

BACKGROUND

Wireless positioning systems often require the use of multiple devices transmitting and receiving wireless signals to observe objects and determine their position within a given space. Information gleaned through the combined analysis of these signals is generally required to accurately determine the position of the object. In short, the devices need to work together to function properly. To work together properly, the devices need to be able to communicate. In many positioning applications, the devices need to be able to communicate directly via a straight-line wireless transmission, and they cannot function properly if they need to communicate through an intermediary or do not otherwise have a straight-line path of communication. The location of the individual positioning devices relative to the system overall is therefore important to consider when placing a system into service or trouble-shooting the performance of an existing system.

Placing a multi-device positioning system into service involves onboarding each of the constituent devices into the system. This can be a challenging procedure as the location of all the devices will set the range of observation available to the system and determine if the system is operable. Therefore, in a system of any appreciable size the devices will be located far apart, and the time spent moving back and forth among the devices to adjust them can be time consuming by itself. Furthermore, the appropriate position of each device depends in part on the position of every other device in the system such that the interrelationships of the multiple devices can explode the complexity of the system. Determining where each device should be placed, or determining which device is causing a system failure, can be difficult to troubleshoot as the web of interrelationships between their positions may be difficult to intuit from the information available to an installer. Furthermore, if there is any appreciable degree of flexibility in terms of where each individual device can be placed, the number of potential configurations of the system is likewise immense and testing all the different potential configurations, or even a subset of the configurations, can be time consuming. For these reasons, an ideal confirmation, or even a functional one, can be difficult to find.

SUMMARY

Systems and methods for efficiently onboarding devices to a positioning system are disclosed. The positioning system can include a collection of devices that need to receive and transmit signals either directly between themselves or indirectly through an object that the system is being used to obtain a position value for. For example, the positioning system can be used to track the location of an object by transmitting wireless signals from a set of positioning devices that are reflected off a tag located on the object. The information received from these reflections by the different positioning devices in the system can then be fused to obtain a single position estimate for the object. The disclosed systems and methods can be used to guide a user through the placement of the positioning devices to avoid or correct for unconnected states that would otherwise have caused the positioning system to fail or perform sub-optimally.

Unconnected states include those in which a positioning device is non-line-of-sight (NLOS), out of range, or otherwise unable to operatively connect with another device in the positioning system. As defined, the set of unconnected states includes a subset of states, which can be referred to as partially connected states, in which a positioning device is positioned in such a manner that it may operatively connect with one or more other devices in the positioning system, but not with one or more other devices in the positioning system. In certain approaches, operative connection involves a connection between two devices in a positioning system that allows the devices to be located by the positioning system using one or more wireless signals sent between the two devices.

The disclosed systems and methods can involve the generation of human-perceptible unconnected indicators that are indicative of unconnected states. In specific embodiments, the systems and methods can also involve the generation of human-perceptible connected indicators. Connected states are those in which a positioning device is operatively connected to every other device in the positioning system. The positioning system is defined by a number of devices needed to identify an accurate position value for an object. The indicators can be issued by a means for issuing a human-perceptible indicator. The human-perceptible indicators can be indicative of connected states. However, they can also be indicative of a transition between unconnected states in which more connections have been made to a single device. The means for issuing a human-perceptible indicator can include a speaker, a display, a light, an automated physical switch or flag, and any system or device for generating an audible, visual, tactile, or otherwise human-perceptible signal.

A human-perceptible indicator can be issued to indicate any change in the number of operative connections between positioning devices in the system. In specific embodiments, a human-perceptible indicator that is indicative of a connected state can be generated automatically and in direct response to the detection of a transition by an individual positioning device from an unconnected state to a connected state or from an unconnected state to an unconnected state with more connections. In specific embodiments, a human-perceptible indicator that is indicative of an unconnected state can be generated automatically and in direct response to the detection of an unconnected state. Real-time issuance of such signals provides highly responsive feedback to a user that is busy handling the installation of the positioning system so that they are informed immediately when they have positioned the device appropriately. The immediate feedback allows them to continue with the installation as soon as a device has been appropriately placed, and allows them to effectively scan for appropriate positions by holding the device and moving it around the space in which it will operate.

In specific embodiments, monitoring for the state of the system can be conducted continuously. In specific embodiments, monitoring for the state of the system can be conducted continuously during a verification phase. In specific embodiments, the system can be continuously prepared to issue a human-perceptible indicator while monitoring for the state of the system. In specific embodiments, the system can issue a human-perceptible indicator or signals to continuously indicate the state of the system. Providing continuous monitoring and/or continuously signaling provides a benefit to a busy user in that that they do not need to manage the additional task of continually triggering a test to see if the devices are in alignment.

In specific embodiments, the human-perceptible indicators issued by the system can be issued in such a way that the user can quickly and intuitively identify how the positioning devices need to be altered to bring all the devices in the positioning system into a connected state. In specific embodiments, the human-perceptible indicators can be issued by the positioning devices themselves. The positioning devices can each have integrated means for issuing human-perceptible indicators for this purpose. For example, the positioning devices may include lights that change color to indicate that they are in a connected or unconnected state, or that they have had a change in their number of connections. In this example, a user can be enabled to immediately detect, from a simple evaluation of the color of the lights on each device, which one of the devices in the system is causing the installation to fail. Furthermore, if the monitoring and the issuance of the signals is conducted continuously, a user will be able to monitor in real time how any number of potential new positions for one of the positioning devices will affect the functionality of the entire system.

Providing an indication as to which devices are causing a failure can provide significant benefits. In positioning systems with a mere four devices, there are 12 one-way wireless connections between the devices. Therefore, trouble-shooting without any guidance as to which devices are causing the failure can be very difficult, and efficient ways to identify specific paths as problematic and provide that information to a user can make the installation process much more efficient. In specific embodiments, in which the positioning devices themselves issue the human-perceptible indicators, the pattern of unconnected and connected indicators display instantaneously by the system as a whole can signal to a user what specific type of failure the system is experiencing. Specific approaches for detecting which devices in the system are causing an installation to fail and for displaying this information to a user, are provided in the detailed description section below.

In one embodiment, a method for onboarding a set of positioning devices to a positioning system includes issuing a human-perceptible unconnected indicator from a first positioning device in the set of positioning devices. The method also includes detecting a connection using a wireless receiver on the first positioning device. The connection is between the first positioning device and a second positioning device in the set of positioning devices. The method also includes issuing, in direct and automatic response to the detecting of the connection, a human-perceptible connected indicator from the first positioning device. Another embodiment includes a computer-readable medium storing instructions for executing the aforementioned method.

Another embodiment includes a positioning system. The system comprises a first positioning device with: (i) a wireless receiver; (ii) a means for issuing a human-perceptible unconnected indicator; (iii) a means for issuing a human-perceptible connected indicator; and (iii) a memory. The system also comprises a second positioning device. The memory stores instructions to detect a connection between the first positioning device and the second positioning device via the wireless receiver, and automatically issue the human-perceptible connected indicator in direct response to detecting of the connection.

DETAILED DESCRIPTION

Systems and methods for efficiently onboarding devices to a positioning system are disclosed in detail below. As described above, in specific embodiments the positioning system can involve the generation of human-perceptible indicators to guide a user in onboarding the devices to the system. As described above, in specific embodiments the devices themselves can generate the human-perceptible indicators. Specific embodiments for detecting which devices in the system are causing an installation to fail and for displaying this information to a user are provided below. The specific embodiments of these systems and methods as disclosed in this section are provided for explanatory purposes and are not meant to limit the invention, the scope of which is provided by the appended claims. A set of these specific embodiments can be described with reference to FIG. 1.

Figure 1:
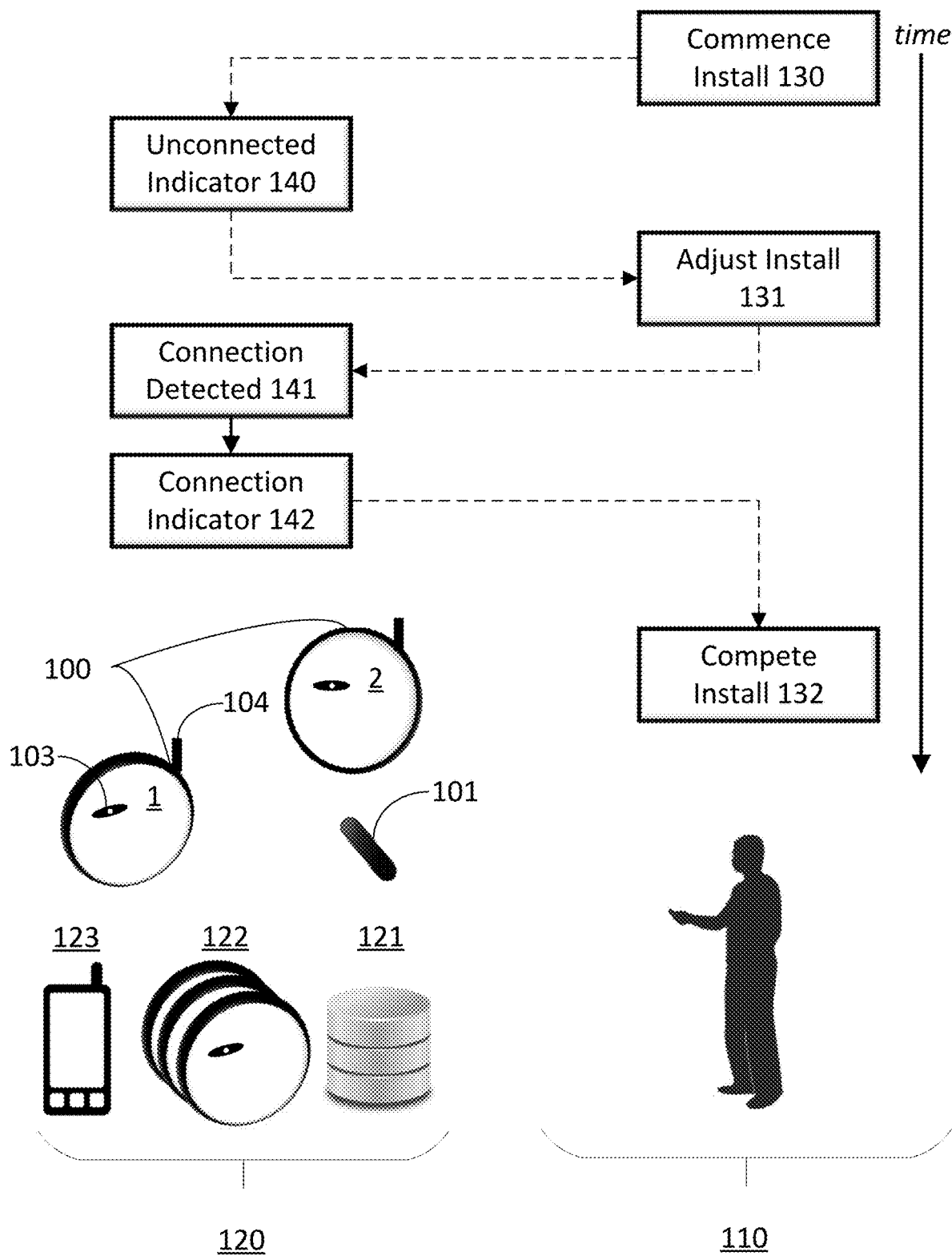
FIG. 1 illustrates a system and a flow chart for a set of methods for efficiently onboarding devices to a positioning system that are in accordance with specific embodiments disclosed herein.

FIG. 1 illustrates two positioning devices 100 that form part of a positioning system used to provide a position value for object 101. For example, the positioning system could be an indoor position system (IPS) and the two positioning devices 100 could be specialized wall mounted beacons used to track an object 101 located within an indoor space. The two positioning devices 100 can locate and provide a position value for object 101 by directing wireless signals to object 101 and detecting a reflection or a return signal from object 101. The set of external positioning devices can include wireless transceivers to emit and measure wireless signals and conduct a time of flight (TOF) analysis on the signals. The signals can be directed to a tag or transceiver located on the object or on another external positioning devices in the system. The position of the object and other external positioning devices can then be determined by measuring the TOF from emission to reception of the signals by knowing the speed of those signals in the considered medium. In specific approaches, the position of the object can then be inferred using methods such as multilateration (MLAT). The positioning system could include other devices that are not illustrated.

In the example of FIG. 1, a connection between device 1 and device 2 is essential for operation of the positioning system to function properly and provide a position estimate for object 101. As such, assuming device 1 has already been installed, onboarding device 2 to the positioning system would include assuring that device 1 and device 2 could communicate appropriately and be in operative communication for the positioning system. The steps of the flow chart of FIG. 1 will be discussed with reference to the onboarding of device 2. However, the steps are more broadly applicable to the onboarding of every device in a positioning system.

A user 110 can be guided through the onboarding and installation process by indicators provided by positioning system 120. Steps conducted by the user 110 are presented on the right side of FIG. 1 while steps conducted by the positioning system 120 are provided on the left side of FIG. 1. Positioning system 120 can include non-transitory computer readable media storing instructions to execute any method steps described with reference to the actions of the positioning system as the instructions are executed by one or more processors. The non-transitory computer readable media can be stored individually upon or divided between a separate server 121, one or more of the positioning devices 122, or a third device 123. The third device could be a smart phone, tablet, or dedicated installation assistance device. The third device could also be a router or dedicated hub for the positioning system. The elements of position system 120 can be connected via one or more wired and/or wireless networks, including the Internet.

The flow chart begins with a step 130 of commencing installation of the positioning system. This step is conducted by user 110 and can include removing a positioning device from its packaging and powering the devices up for the first time. In an IPS, this step can also include mounting the device on a wall. The positioning device could be placed on a wall upon which no other device was yet placed. The positioning device could be set to a point with a height of at least two meters and whose distance from any obstacle in the room (e.g., a door or furniture) seems maximal. Step 130 can include repeating the above actions for every positioning device in the system, or can include just installing a single device. This step can be guided by product literature provided with the device. In the case of an IPS, this step can include attaching the positioning device (or devices) to the wall using a screw, nail, tack, or equivalent method. This step can also include attaching the positioning device (or devices) using an adhesive. The adhesive could be an integral part of the device when it is removed from the packaging. The adhesive can provide a strong connection to the wall but can also be designed for easy removal and repositioning. For example, the adhesive itself could be designed to be detached and then reattached, or the device could include multiple adhesive segments along with is packaging so that it could be installed and reinstalled multiple times in various positions.

The flow chart continues with a step 140 of issuing a human-perceptible unconnected indicator from a first positioning device in the set of positioning devices. The human-perceptible unconnected indicator could alternatively be issued by an alternative device such as a speaker or display on a dedicated hub for the positioning system, a smart phone, tablet, or separate computer. A single positioning device in the system could also differ from the other devices in the system and include a dedicated means for issuing the human-perceptible indicators while the others did not. The unconnected indicator can be issued as soon as the device detects a lack of operative connection between itself and another device in the positioning system, and after the device has been powered on or a verification phase is initiated. The first positioning device could be positioning device 1. The device could be the first device installed in the system, such that there were no other devices to connect to, or it could be any device installed in a completely installed system but unable to connect with enough of the other device in the system to function properly.

The indicator can be issued by a means for issuing a human-perceptible indicator integrated with the positioning device that is unconnected. In the example of FIG. 1, positioning device 1 includes an LED 103 which can flash in a pattern or turn on a specific color to indicate that device 1 is in an unconnected state. Approaches for detecting and issuing an unconnected indicator are provided below. In particular, the unconnected indicator does not need to be issued by the first positioning device. Instead, the indicator can be issued by a means for issuing a human-perceptible indicator integrated with another positioning devices in the system or another device entirely such as third device 123.

The flow chart continues with a step 131 in which user 110 adjusts the installation of the positioning system. As seen in the diagram, this step is conducted by user 110 in response to the issuance of the human-perceptible unconnected indicator. In particular, in approaches in which the positioning devices issue their own unconnected indicators, step 131 can involve adjusting the position of one of the devices that issued a human-perceptible unconnected indicator in step 140. For example, if the LED on device 1 turned on to indicate an unconnected state in step 140, step 131 could involve a user removing device 1 from the wall and moving it towards device 2. The unconnected indicator issued in step 140 could guide user 110 towards the device that was introducing a failure to the system. The indicator could also include information concerning how to fix the error as will be described below. In approaches in which step 130 involves the placement of a single device in the positioning system, step 131 can involve placing more devices into the system. However, in approaches in which step 130 involves the placement of all the devices in the positioning system, step 131 can involve altering the position of a device in the positioning system.

The flow chart continues with a step 141 of detecting a connection and a step 142 of issuing a human-perceptible connected indicator. The connection can be detected by a wireless receiver on one of the positioning devices. The connected condition indicator can indicate a connection between the first positioning device and a second positioning device in the set of positioning devices. For example, a signal received by a wireless receiver including antenna 104 could indicate a connection with device 2. The human-perceptible connected indicator can be issued by another portion of the same means for issuing human-perceptible indicators that was used in step 140. For example, a control signal for generating red light on an LED could be used in step 140 to generate the unconnected indicator while a control signal for generating green light on that same LED could be used in step 142 to generate the connected indicator. The human-perceptible connected indicator could also be the cessation of a human-perceptible unconnected indicator. Likewise, the human-perceptible unconnected indicator could also be the cessation of a human-perceptible connected indicator. In other words, LED 103 could turn on in step 140 and turn off in step 142. Different variations for both signals and the manner in which they relate to each other are provide below.

The system can be continually monitoring the state of the component positioning devices while step 131 is conducted such that the user does not need to continually initiate a check of the system every time the device is moved to a new location. Subsequently, the human-perceptible connected indicator can be issued in direct and automatic response to the detecting of the connection. In certain approaches, such a system can provide real-time feedback to the user to greatly enhance the efficiency of the system. The benefits of this approach can be described with reference to FIG. 2.

Figure 2:
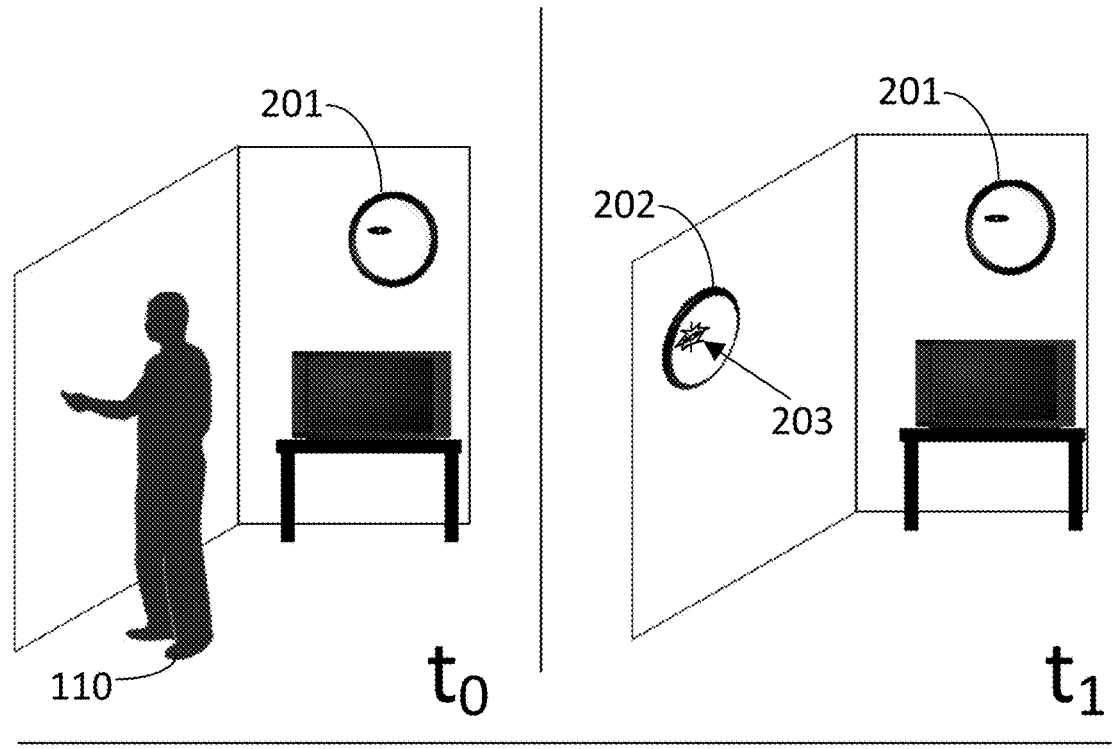
FIG. 2 illustrates a chronological procedure for a specific approach for efficiently onboarding a device to a positioning system in accordance with specific embodiments disclosed with reference to FIG. 1
Figure 2:
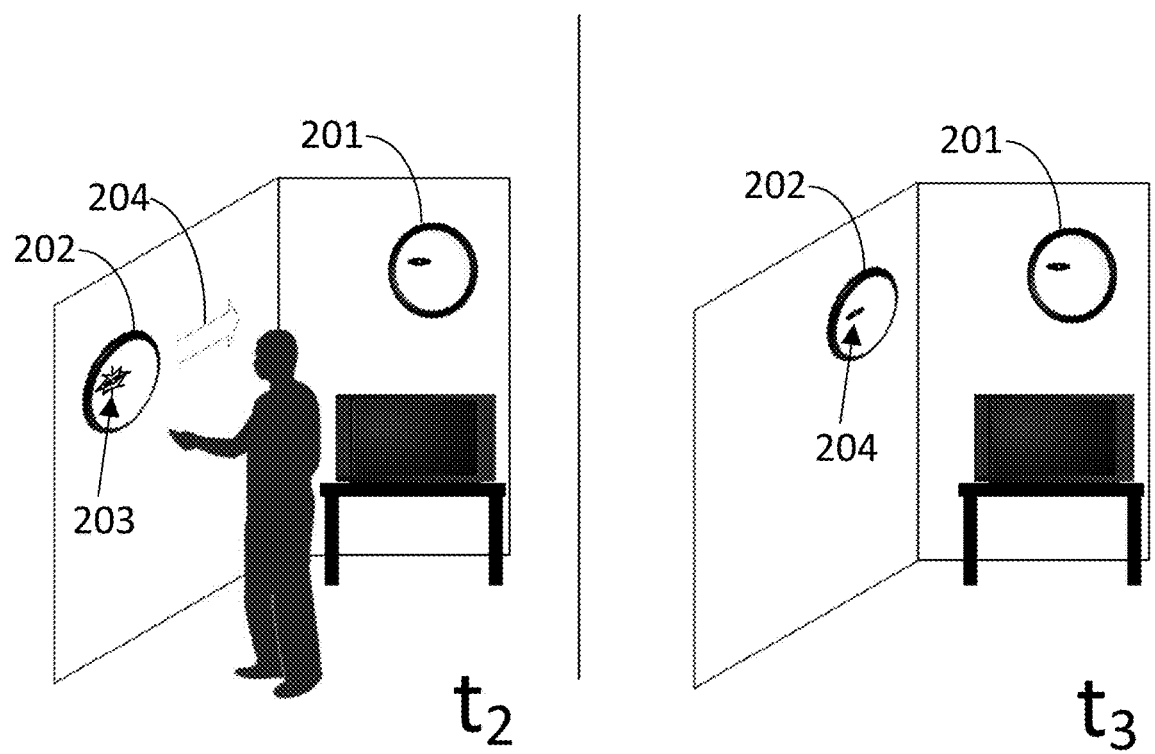

FIG. 2 is a chronological illustration showing a user 110 installing a positioning system in an indoor environment. The images show user 110 onboarding a new device 202 into the system. At time $t_0$, the user has already installed a first device 201, which is attached to the wall and powered on, and is in the process of installing new device 202 to a different wall. As seen in time $t_1$, when new device 202 is installed and either powered on or set to a verification mode, the device issues a human-perceptible unconnected indicator in the form of a light 203 emanating from an LED on the device. In the approach of FIG. 2, this signal is provided almost immediately upon the system entering a verification phase or upon device 202 being turned on. Indeed, device 202 does not need to be attached to the wall at this point, and can instead have been pulled from a package and held up against the wall at the location it is in at time $t_1$. Regardless, the indicator will inform the user that the device is in an unconnected state and prompt the user to correct this issue.

Upon reviewing the state of the system, user 110 could intuit from the signal issued by device 202 that device 202 was out of range of device 201. Alternatively, the unconnected signal issued by the device could include information regarding how to correct the issue. For example, the system could issue an audible statement such as: "Device 2 is out of range." Regardless of how the user determines what the issue is, as shown at time $t_2$ the user can then begin to move device 202 in direction 204 along the wall such that it is closer to device 201. Since device 202 is continuously monitoring its state and directly and automatically issues a signal in response to that state, as soon as device 202 connects to device 201, the device can issue a human perceptible connected indicator. In the illustrated case, the device issues a human-perceptible connected indicator in the form of a cessation of light emanating from the same LED 203. Upon receiving that information, the user can immediately install device 202 to the wall at the new location as shown at time $t_3$, and continue with the next device in the system. Using this approach and others like it, wherein the connected indicator is provided in direct and automatic response to the detecting of a connection, and in particular where the device is continually monitoring its state, users are provided with a highly efficient method for onboarding devices to a network of positioning devices.

Returning to FIG. 1, once the system has issued a connected indicator in step 142, user 110 can complete the installation in a step 132. Using the example of an IPS, completing the installation can involve attaching the device to a location on a wall where the connected indicator provides an indication that the device would function properly. The process can then continue with the installation of another device to add to the system or turn off the validation state and let the system run. As stated previously, step 130 can involve installing all of the devices at once before triggering a verification phase to determine if devices are not connected properly. In these approaches, there may be multiple iterations of steps 131 and 141/142 as individual devices in the system are adjusted. There may even be a new iteration of step 140 as the movement of one device to a superior location for the system overall may cause another device to no longer be positioned in an ideal location. In any of these approaches, step 132 is not executed until every device has been arranged appropriately, and there are no more unconnected indictors being issued by the system. Also, as stated previously, step 130 can involve onboarding a single device to the system and completing installation of that one device in step 132 can be followed by a return to step 130 with a new device.

Figure 3:
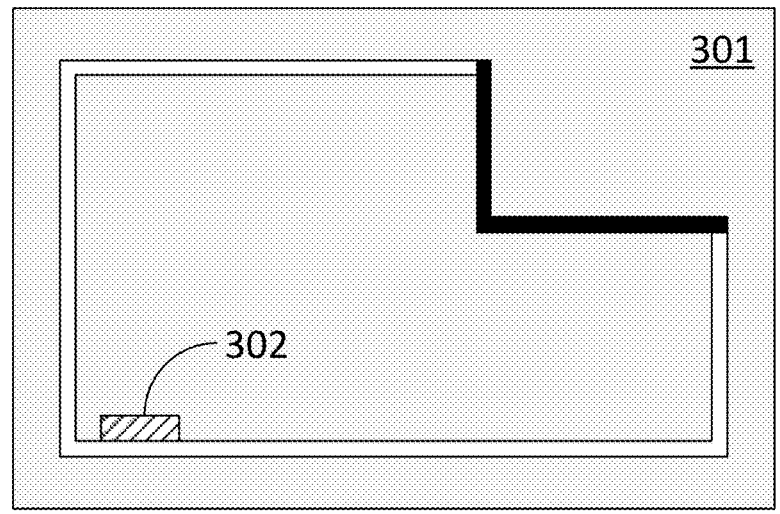
FIG. 3 illustrates three indoor positioning system (IPS) top down diagrams that illustrate some of the conditions that may lead to the detection of an unconnected state in accordance with specific embodiments disclosed with reference to FIG. 1.
Figure 3:
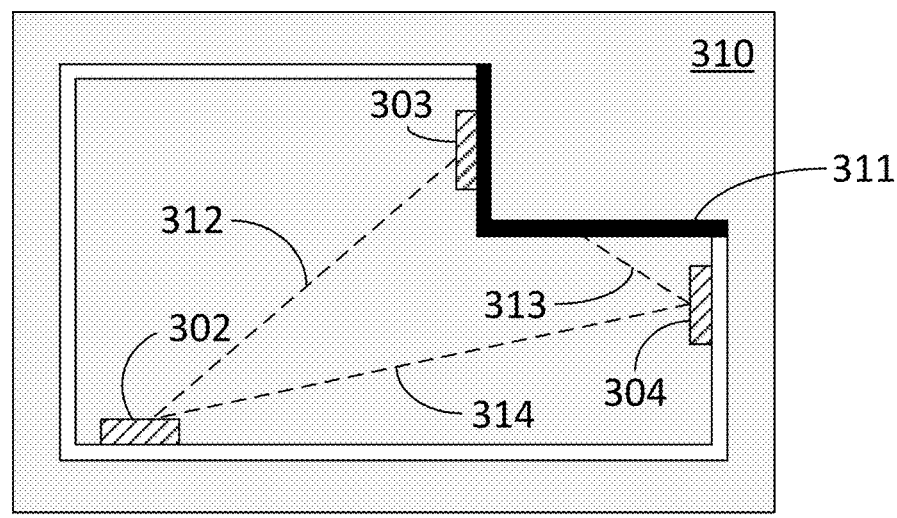
Figure 3:
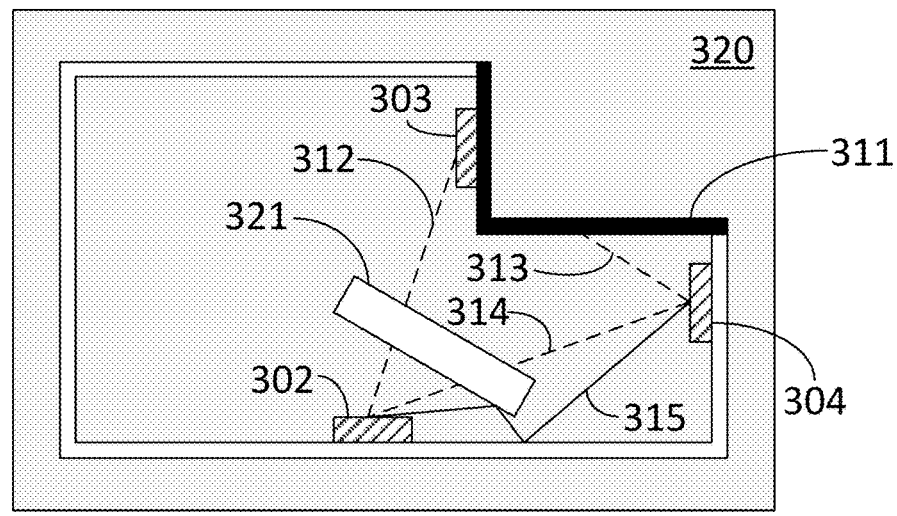

Specific embodiments of the systems and methods described with reference to FIG. 1 rely on the system's ability to determine when individual devices in the system are in a connected state, are in an unconnected state, and when the devices obtain a new connection or lose a connection. As stated above, unconnected states include those in which a positioning device is non-line-of-sight (NLOS), out of range, or otherwise unable to connect with at least one other device in the positioning system. Unconnected states include those in which at least one positioning device is not placed to appropriately contribute to the position estimate generated by the positioning system. As the positioning system may require each device to be able to determine its own position (i.e., conduct auto-localization), the device may require enough contacts with other devices to multiliterate its position in order for the device to be in a connected state. Auto-localization supposes that inter-device measurements are possible and reliable with a sufficient number of alternative devices. If this is not true, the device may be in an unconnected state. A description of the various kinds of positioning errors that can contribute to a device operating in an unconnected state are provided with reference to FIG. 3. Although the examples provided in FIG. 3 are all IPSs, the approaches disclosed herein are more broadly applicable to any positioning system.

Room diagram 301 includes a single positioning device 302 that has been mounted to a wall of the room. As illustrated, the device is filled with cross hashed lines to indicate that the device is in an unconnected state. In FIG. 3, and the following diagrams, a device filled with cross hashed lines can also be used to represent a device that is currently issuing an unconnected device indicator. For example, device 302 could include an LED and could be continuously issuing a red light because it has detected that it is in an unconnected state. In the illustrated situation, device 302 is unconnected because there are no other devices installed. Room diagram 310 highlights the fact that a device that is out of range from other devices in the system might not inherently be able to distinguish if it is in an unconnected state because it is truly out of range of other devices in the system, or if not all devices in the system have been installed yet. In approaches in which the set of devices is installed and a validation phase is subsequently triggered, there is no reason to distinguish the state of device 302 from those in room diagrams 310 and 320. In situations in which all of the devices are installed before a verification phase is triggered, the devices can each be preprogrammed to know how many devices are in the system, and thereby recognize they are in an unconnected state if they are not connected to that number of devices. However, in situations where the validation phase is continuous from whenever a device is first entered to the system, there may be a need to keep track of how many devices have been installed. This can be accomplished via an alternative system that harvests and provides that information to each device. The alternative system may be capable of providing information to the devices, but not the ability to position the devices. For example, a connection to a wireless data network could provide a count of the number of installed devices to each device that has been installed in the system. Therefore, with this information, device 302 in room diagram 301 would be able to determine that it was the only device installed, and would not issue an unconnected indicator.

Room diagram 310 includes two additional devices 303 and 304. The straight-line path connections between the devices are 312, 313, and 314. Room diagram 310 shows an arrangement of three positioning devices that can be used to explain out of range and NLOS errors. In room diagram 310, solid exterior wall 311 presents a convex 90-degree angle to the center of the room. As a result, the geometry of the room has obtruded path 313 between device 303 and 304 by multiple walls as in the case of the two sides of wall 311. Devices 303 and 304 are therefore NLOS to each other. Furthermore, if the range of the devices is limited and room 310 is large enough, paths 312 and 314 may be too far for the devices to communicate appropriately. In these cases, the devices may be able to detect each other to know that they should have a connection, but might not be able to connect reliably enough to report that they are in a connected state and capable of using a signal transmitted between themselves for purposes of auto-localization. For example, the devices could detect that the time-of-arrival (TOA) of the transmitted signals was too high or that the signal strength of the received signals was not high enough. As a result, device 302 may be out of range from both device 303 and 304. As illustrated in FIG. 3 and the following diagram, dotted line paths show a straight-line path that is not yielding an appropriate connection.

Room diagram 320 is similar to room diagram 310 except that device 302 has been moved closer to the other devices and an obstruction 321 has been added to the middle of the room. In this situation, device 302 is still not connected to devices 303 and 304, even though it has been moved within range of these devices. Diagram 320 also includes an indirect path 315 between devices 304 and 302. The diagram highlights that devices in the positioning system can benefit from measuring signal angle-of-arrival (AOA) so that they can assure they are measuring a signal from a given device taking the same path through the environment from one measurement to the next without needing to conduct a multipath analysis on the received signals.

A positioning system in accordance with this disclosure may use any one or more of various different approaches for detecting unconnected states. The devices could enter verification mode independently or as a group. The devices could monitor for unconnected and connected states in a verification mode that was separate from an ordinary operating mode. The devices could periodically enter the verification mode automatically or enter the verification mode upon receiving a trigger from the user such as an explicit command to conduct verification or an implicit command such as a power up or reset of the system or individual devices. For example, a device could enter verification upon being taken out of its packaging and having its battery connected to the device's power rails. As another example, a user could press a verification button on the positioning device which would send a signal to the entire system to enter a verification phase. As another example, the system could detect when all devices in the system had been added or when a new device was being onboarded and cause the devices to enter a verification mode. An implicit command to enter verification mode could also involve placing the device on the wall such that a pressure sensor was depressed, or a proximity sensor covered, on the back surface of the device.

A positioning system in accordance with this disclosure can be designed to detect faults on the individual devices using various methods and detect faults of one or more varying kinds. The positioning system can detect the state of individual devices using any of: preprogrammed knowledge of the size of the positioning system; a measured tally of the number of devices that have already been installed; and information gleaned from alternative sources such as a wireless data network. Also, since the positioning devices are likely, by their nature, to be preconfigured to transmit wireless signals for positioning, a beneficial approach is to measure and analyze those signals for purposes of determining if a given device is operatively connected to another. The signals can be analyzed based on a time of Arrival (TOA), Angle of Arrival (AOA), and/or Received Signal Strength Indication (RSSI) metric. In specific embodiments, the signals will be strong enough to inform a device that it needs to be connected to another device, but too weak to pass an RSSI metric. As such, the device can determine both the presence of other devices in the system and also that it is not operatively connected to the other devices.

The positioning system may detect an NLOS condition or other condition leading to an unconnected state if the system fails to estimate the relative distance of the positioning devices in the system. This may happen in TAO and AOA systems that necessitate the detection of the first peak in an impulse response. If the signal is too weak, meaning the positioning devices are too far away or in NLOS, the first peak in the impulse response is not dissociable from noise and the measurement will fail. A success average on N repeated measurements can be made to lessen the sensitivity of the verification system to isolated failures. In certain approaches, even if the measurement succeeds, the received signal power may be too weak or incoherent with the measured distance. This is particularly possible if some form of solid object obtruded the measurement path. The positioning system may still determine that there is a device there that should be connected to either by being programmed for only entering verification when all devices have been installed, receiving a different more powerful signal from another device than the one typically used for measuring position, or receiving information indirectly from an external source such as a wireless data network.

In specific embodiments, if the positioning system knows a sufficient number of devices are installed, but can't reliably estimate the relative distances and locations of the positioning devices in the system, the system can report an unconnected state. The positioning system may also detect an NLOS condition or other condition causing an unconnected state if the system does manage to estimate the relative distances of the positioning devices in the system, but those positions are not reconcilable. For example, given three anchors positions A, B and C. The distance AC can't be superior to the added distance AB+BC. If the positioning system determined that AC was greater than AB+BC, the system could determine that some of the devices are NLOS. Indeed, as the reported distance between devices is generally amplified in NLOS situations, distances that are larger than expected can be determined to be the source of a system failure, and distance AC is most likely suspect. As another example, if a fourth anchor D is added to the system, cumulated measured distance DA+DB+DC has to be superior to the cumulated distance MA+MB+MC of the ABC triangle's median point M. If this is not the case, then the paths between A, B and C are then suspected to be in NLOS. The mathematical expression for this concept is as follows. Given N anchors with indices $i \in S=[1, N]$ and respective positions $r_i$; $\forall j \in S$ we have $\Sigma_{k \neq j} d_{k,j} > \Sigma_{k \neq j} |r_k - a|$ with a the median of the positions $r_l$ and $l \in S-j$, with $d_{k,j}$ the measured distances from the k-th to the j-th anchor.

Now considering a fifth device being added to the system, given an object to be positioned and four positioning devices, a first object position estimate T' can be obtained by trilateration using three of the four positioning devices. Then, the estimated distance from the fourth positioning device to the first object position estimate T' should be close to the actual measured distance by this fourth device to the object. In these approaches, the unconnected state can be detected if the trilateration distance does not accurately match the distance to the object measured using the four devices. The mathematical expression for this concept is as follows. Given a set of anchors with indices i $\in S=[1, N]$, $N>4$ and respective positions $r_i$; $\forall j, k \in S$, and $j \neq k$ the j-th anchor estimated position $\hat{r}_j$ given by multi-lateration based on anchors of indices $l \in S$-j-k should satisfy $|\hat{r}_j - r_k| \sim d_{k,j}$, with $d_{k,j}$ the measured distances from the k-th to the j-th anchor.

The positioning system can report an unconnected state, new connection, dropped connection, or connected states in various ways. As mentioned, the system can issue a human-perceptible unconnected indicator or human-perceptible connected indicator in the form of visible light, sound, haptic outputs, or any other human-perceptible type of signal. The indicators can also identify specific positioning devices that are in an unconnected state themselves or that are causing other devices to be in an unconnected state. The indicators can also provide guidance as to how the unconnected state can be remedied. In one example, the indicator is generated by the specific device that is in the unconnected or connected state, or that recently gained or lost a connection, and thereby inherently identifies itself. In other examples, the signal will be issued by a different device from the one that the signal relates to, and the signal will include information that identifies the device such as by a symbol on the device like a number, color, or shape.

Figure 4:
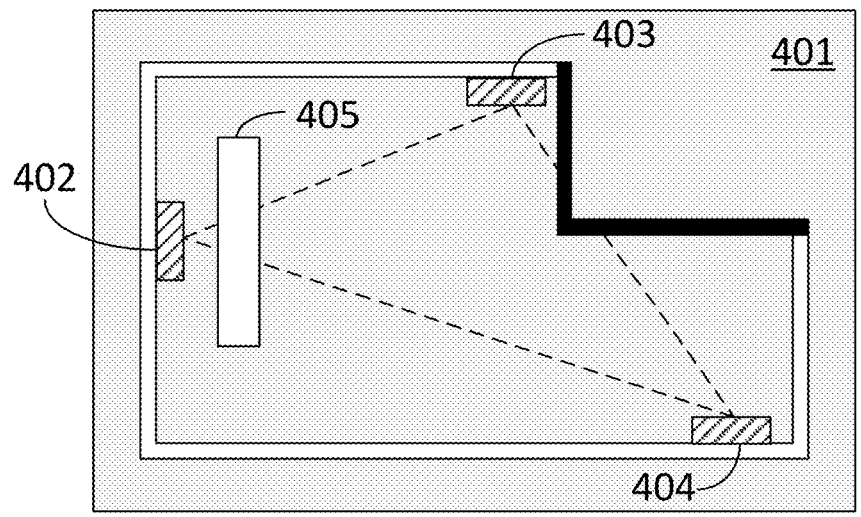
FIG. 4 illustrates three IPS top down diagrams that illustrate how different states of the positioning system can be efficiently reported to a user in accordance with specific embodiments disclosed herein.
Figure 4:
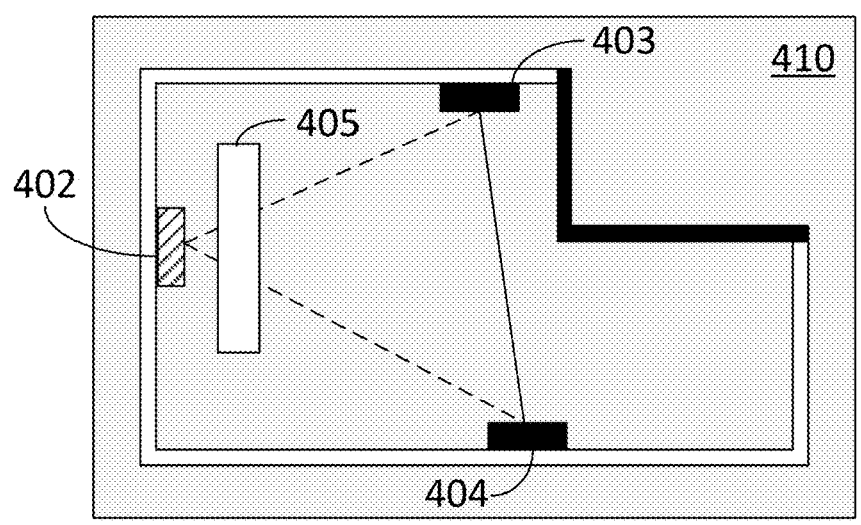
Figure 4:
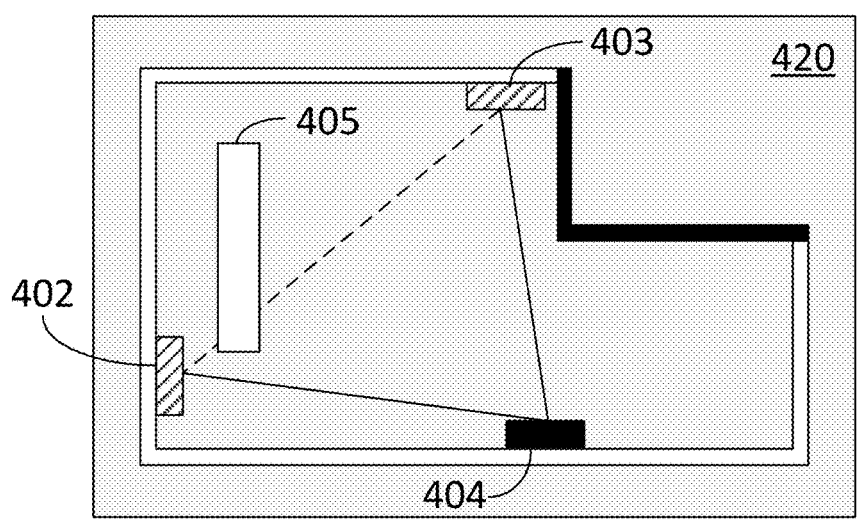

In the specific case of the human-perceptible signals being issued by the positioning devices themselves, the pattern of emission of the signals can provide information to the user regarding what specific failure the system is experiencing. FIG. 4 provides an example of such an approach with reference to an IPS in three different states represented by room diagrams 401, 410, and 420. The IPS of FIG. 4 includes three devices 402, 403, and 404. In this diagram, devices that are cross hatched are emitting a human-perceptible unconnected indicator in the form of a red light and devices that are filled in solid are emitting a human-perceptible connected indicator in the form of a green light. Also, dotted lines indicate NLOS connections and solid lines indicate adequate line-of-sight connections. In the example of FIG. 4, the unconnected and connected indicators being issued by the devices can be understood in combination by a user to trouble shoot and adjust the installation. An obstruction 405 is also represented in FIG. 4.

In room diagram 401, all three paths between the devices are obtruded, and each device issues a human-perceptible unconnected indicator. Upon reviewing this situation, a user can select any red device and adjusted it. For example, the user could move device 404 such that the system exhibited the state illustrated by room diagram 410. In room diagram 410, one device is NLOS with the other two, and device 402 continues to issue a human-perceptible unconnected indicator. In real time feedback implementations, device 403 and 404 would switch immediately from red to green as soon as device 404 had a clear path with device 403. Upon reviewing the updated situation in room diagram 410, a user can again use the simple rule of selecting any red device and adjusting it because there is only one device that is causing a problem. For example, the user could move device 402 such that the system exhibited the state illustrated by room diagram 420.

The configuration of room diagram 420 has been selected to illustrate the particular manner in which the pattern of indicators of this particular embodiment functions. Using approaches in accordance with this embodiment, the pattern of indicators in a three device system can exclusively identify a particular cause of an unconnected state. For example, two devices issuing an unconnected indicator while a third device does not can exclusively identify the path between those two devices as causing the positioning system to fail. As another example, a single device issuing an unconnected indicator, while the other two do not, can exclusively identify both paths to that device as causing the positioning system to fail. As illustrated, device 402 has been moved and there is only one straight-line path that is not yielding an appropriate connection as compared to two such paths in room diagram 410. However, the number of devices issuing a human perceptible unconnected indicator has increased in the transition from room diagram 410 to room diagram 410. This approach is somewhat counterintuitive because there are now more total sufficient connections, but there are also more unconnected indicators. However, using this specific approach, the pattern of indicators emitted by the positioning devices definitively identifies the specific paths that are failing in the system.

The approach illustrated in FIG. 4 is able to represent every form of unconnected combination of three devices using a pattern of basic binary signaling by each of the devices. A single device issuing an unconnected indicator is always one that has two failed connections, which are the only two paths that are failing. Only two devices issuing an unconnected indicator always represent a failed connection between them. All three devices issuing an unconnected indicator represent that all three paths are failing. Although the roles of the devices in those configurations can change, that is the full library of potential states for the system of three devices to be in. Therefore, if provided with instructions regarding how the system operates, the user will know immediately what paths are failing in the positioning system when reviewing.

The approach of FIG. 4 can be extended to positioning systems with more than three devices. For example, in the case of a four-device positioning system, if one device is NLOS with two or more other anchors, it will issue an unconnected indicator. Then the system examines every potential pair of devices that is not issuing an unconnected indicator and, if an NLOS path is detected between them, the devices forming the NLOS path both issue an unconnected indicator. The user can then be encouraged to find a new spot for the remaining devices. As the devices are moved, the devices can issue unconnected or connected indicators in real-time when the position satisfies or fails to provide adequate connections with other devices in the system. The refinement procedure can end when all the anchors emit a connected indicator.

Figure 5:
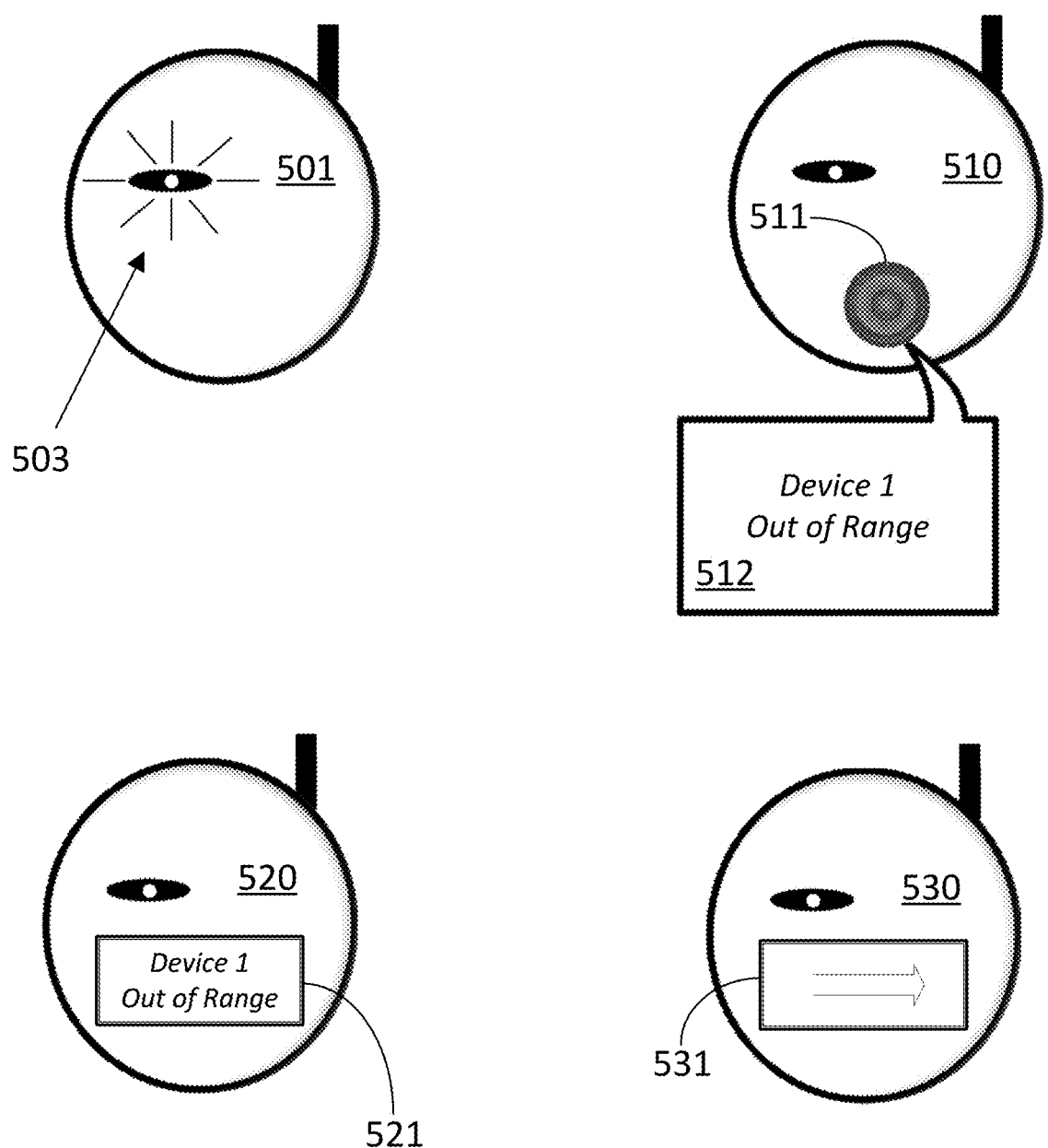
FIG. 5 illustrated different positioning system devices issuing unconnected state indicators in accordance with specific embodiments disclosed herein.

The positioning system can provide information regarding how to trouble shoot the connectivity of the system in various other ways. The connected and unconnected indicators can identify specific devices that need to be adjusted and explicitly describe how the devices should be moved to remedy the situation. FIG. 5 provides a few examples of how this could be done. In the basic case, a device such as device 501 could include an LED 503 for issuing a connected or unconnected indicator. Furthermore, the LED could have the ability to smoothly transition from red to green to indicate to the user that they are moving the device in the right direction as it is repositioned, where the device gets greener as the position becomes better. In another case, a device such as device 510 could include a speaker 511 to issue audible instructions 512. The instructions could identify specific devices and the specific error causing the specific device to not properly connect such as "Device 1 is out of range" or "Device 1 is NLOS." The instructions could also explicitly provide instructions regarding repositioning such as "Move device 1 two meters left." In another case, device 520 could include a display for issuing text directions 521 with characteristics similar to those of audible instructions 512. In another case, a device such as device 530 could include a display 531 for presenting instructions in the form of symbols such as an arrow indicating the direction a device should be moved in order to improve its connectivity. In the example of device 530, the instructions are informing the user to move device 530 to the left along the wall. The arrows could point in any direction, or be limited to two dimensions, and could include a gradual change in size or change in color as they were moved to the position that the positioning system found optimal. The direction of the arrow could likewise change as the device was moved along a wall, or otherwise through a space, in order to guide the user in real time to the optimum placement.

The object being tracked by the positioning systems disclosed herein can be any object whose position needs to be determined by an automated system with a high degree of accuracy. The object can be a pointing device such as a remote control, presentation pointer, inventory management device, or a toy used for wireless tag. The pointing device will have a defined pointing direction which is associated with a heading the user aligns a target with when pointing. In other embodiments, the object can be a drone, smart phone, tablet computer, wearable computing device, or any other computing device. In the specific example of FIG. 1, object 101 is a dedicated device that operates as a universal controller. The controller can operate to control one or more electronic devices and may transmit signals to these devices using any form of wireless transmitter. The tracking system can be used to determine which device the controller is pointing towards at any given time.

While the specification has been described in detail with respect to specific embodiments of the invention, it will be appreciated that those skilled in the art, upon attaining an understanding of the foregoing, may readily conceive of alterations to, variations of, and equivalents to these embodiments. For example, while the example of a positioning system has been used as an example environment throughout this disclosure, some of the approaches disclosed herein are more broadly applicable to other operating environments, such as in assisting a user in the installation of motes in a mesh network. These and other modifications and variations to the present invention may be practiced by those skilled in the art, without departing from the scope of the present invention, which is more particularly set forth in the appended claims.

What is claimed is:

1. A method, for onboarding a set of positioning devices to a positioning system, comprising:
issuing a human-perceptible unconnected indicator from a first positioning device in the set of positioning devices;
issuing a second human-perceptible unconnected indicator from a second positioning device in the set of positioning devices;
wherein the positioning system exclusively identifies a failure to provide an adequate connection between the first positioning device and the second positioning device using the human-perceptible unconnected indicator and the second human-perceptible unconnected indicator;
detecting a connection using a wireless receiver on the first positioning device, wherein the connection is between the first positioning device and the second positioning device in the set of positioning devices; and
issuing, in direct and automatic response to the detecting of the connection, a human-perceptible connected indicator from the first positioning device.

2. The method of claim 1, further comprising:
determining a position of the first positioning device using: (i) the wireless receiver; and (ii) multi-lateration conducted on a set of signals transmitted by the positioning system.

3. The method of claim 1, wherein:
the human-perceptible unconnected indicator is an audible text message; and
the human-perceptible unconnected indicator identifies an unconnected positioning device in the positioning system.

4. The method of claim 1, further comprising:
detecting an unconnected state using the wireless receiver on the first positioning device;
wherein the unconnected state is one of: (i) a non-line of sight condition with the second positioning device in the set of positioning devices; and (ii) an out of range condition with the second positioning device in the set of positioning devices; and
wherein the human-perceptible unconnected indicator is issued continuously from when the unconnected state is determined until when the connection is detected.

5. The method of claim 1, further comprising:
determining an unconnected state using a processor on the first positioning device;
wherein the human-perceptible unconnected indicator is issued continuously from when the unconnected state is determined until when the connection is detected; and
wherein the human-perceptible unconnected indicator is in the form of visible light.

6. The method of claim 5, wherein:
the human-perceptible connected indicator is issued continuously, from the first positioning device, after the connection is detected;
the human-perceptible unconnected indicator is in the form of visible light of a first color;
the human-perceptible connected indicator is in the form of visible light of a second color; and
the first color and the second color are different.

7. The method of claim 5, further comprising:
determining a first distance between the first positioning device and the second positioning device using the set of positioning devices;
determining a second distance between the first positioning device and a third positioning device using the set of positioning devices;
determining a third distance between the second positioning device and the third positioning device using the set of positioning devices; and
wherein determining the unconnected state involves evaluating the first, second, and third distances.

8. The method of claim 1, further comprising:
determining a position value for an object using a set of signals transmitted from a subset of positioning devices in the set of positioning devices;

determining a position value for the first positioning device using a second set of signals transmitted from the subset of positioning devices;

determining a first distance value using the position value of the object and the position value for the first positioning device;

determining a second distance value from the object to the first positioning device using a signal transmitted from the first positioning device; and detecting an unconnected state by evaluating the first distance value and the second distance value.

9. The method of claim 1, further comprising:
determining an unconnected state using a processor on the first positioning device;
wherein the unconnected state is inferred from preprogrammed knowledge, stored by the positioning system, of the size of the set of positioning devices.

10. The method of claim 1, wherein:
the human-perceptible unconnected indicator and the second human-perceptible unconnected indicator are in the form of visible light of a first color;
the human-perceptible connected indicator is in the form of visible light of a second color; and
the first color and the second color are different.

11. A non-transitory computer-readable medium storing instructions for executing a method by a positioning system, wherein the method comprises:
issuing a human-perceptible unconnected indicator from a first positioning device in a set of positioning devices;
issuing a second human-perceptible unconnected indicator from a second positioning device in the set of positioning devices;
wherein the positioning system exclusively identifies a failure to provide an adequate connection between the first positioning device and the second positioning device using the human-perceptible unconnected indicator and the second human-perceptible unconnected indicator;
detecting a connection using a wireless receiver on the first positioning device, wherein the connection is between the first positioning device and the second positioning device in the set of positioning devices; and
issuing, in direct and automatic response to the detecting of the connection, a human-perceptible connected indicator from the first positioning device.

12. The non-transitory computer-readable medium of claim 11, wherein the method further comprises:
determining a position of the first positioning device using: (i) the wireless receiver; and (ii) multi-lateration conducted on a set of signals transmitted by the set of positioning devices.

13. The non-transitory computer-readable medium of claim 11, wherein:
the human-perceptible unconnected indicator is an audible text message; and
the human-perceptible unconnected indicator identifies an unconnected positioning device in the set of positioning devices.

14. The non-transitory computer-readable medium of claim 11, wherein the method further comprises:
detecting an unconnected state using the wireless receiver on the first positioning device;
wherein the unconnected state is one of: (i) a non-line of sight condition with the second positioning device in the set of positioning devices; and (ii) an out of range condition with the second positioning device in the set of positioning devices; and wherein the human-perceptible unconnected indicator is issued continuously from when the unconnected state is determined until when the connection is detected.

15. The non-transitory computer-readable medium of claim 11, wherein the method further comprises:
determining an unconnected state using a processor on the first positioning device;
wherein the human-perceptible unconnected indicator is issued continuously from when the unconnected state is determined until when the connection is detected; and
wherein the human-perceptible unconnected indicator is in the form of visible light.

16. The non-transitory computer-readable medium of claim 15, wherein:
the human-perceptible connected indicator is issued continuously, from the first positioning device, after the connection is detected;
the human-perceptible unconnected indicator is in the form of visible light of a first color;
the human-perceptible connected indicator is in the form of visible light of a second color; and
the first color and the second color are different.

17. The non-transitory computer-readable medium of claim 15, wherein the method further comprises:
determining a first distance between the first positioning device and the second positioning device using the set of positioning devices;
determining a second distance between the first positioning device and a third positioning device using the set of positioning devices;
determining a third distance between the second positioning device and the third positioning device using the set of positioning devices; and
wherein determining the unconnected state involves evaluating the first, second, and third distances.

18. The non-transitory computer-readable medium of claim 11, wherein the method further comprises:
determining a position value for an object using a set of signals transmitted from a subset of positioning devices in the set of positioning devices;
determining a position value for the first positioning device using a second set of signals transmitted from the subset of positioning devices;
determining a first distance value using the position value of the object and the position value for the first positioning device;
determining a second distance value from the object to the first positioning device using a signal transmitted from the first positioning device; and
detecting an unconnected state by evaluating the first distance value and the second distance value.

19. The non-transitory computer-readable medium of claim 11, wherein the method further comprises:
determining an unconnected state using a processor on the first positioning device;
wherein the unconnected state is inferred from preprogrammed knowledge of the size of the set of positioning devices.

20. The non-transitory computer-readable medium of claim 11, wherein:
the human-perceptible unconnected indicator and second human-perceptible unconnected indicator are in the form of visible light of a first color;
the human-perceptible connected indicator is in the form of visible light of a second color; and
the first color and the second color are different.

21. A positioning system comprising:
a first positioning device with: (i) a wireless receiver; (ii) a means for issuing a human-perceptible unconnected indicator; (iii) a means for issuing a human-perceptible connected indicator; and (iii) a memory; and
a second positioning device with a means for issuing a second human-perceptible unconnected indicator;
wherein the memory stores instructions to:
   detect a connection between the first positioning device and the second positioning device via the wireless receiver; and
   automatically issue the human-perceptible connected indicator in direct response to detecting of the connection;
wherein the positioning system exclusively identifies a failure to provide an adequate connection between the first positioning device and the second positioning device using the human-perceptible unconnected indicator and the second human-perceptible unconnected indicator.

22. The positioning system of claim 21, wherein the memory further stores instructions to:
determine a position of the first positioning device using: (i) the wireless receiver; and (ii) multi-lateration conducted on a set of signals transmitted by the positioning system.

23. The positioning system of claim 21, wherein:
the human-perceptible unconnected indicator is an audible text message; and
the human-perceptible unconnected indicator identifies an unconnected positioning device in the positioning system.

24. The positioning system of claim 21, wherein the memory further stores instructions to:
detect an unconnected state using the wireless receiver on the first positioning device;
wherein the unconnected state is one of: (i) a non-line of sight condition with the second positioning device; and (ii) an out of range condition with the second positioning device; and
wherein the human-perceptible unconnected indicator is issued continuously from when the unconnected state is determined until when the connection is detected.

25. The positioning system of claim 21, wherein the memory further stores instructions to:
determine an unconnected state using a processor on the first positioning device;
wherein the human-perceptible unconnected indicator is issued continuously from when the unconnected state is determined until when the connection is detected; and
wherein the human-perceptible unconnected indicator is in the form of visible light.

26. A method, for onboarding a set of positioning devices to a positioning system, comprising:
issuing a human-perceptible unconnected indicator from a first positioning device in the set of positioning devices;
detecting a connection using a wireless receiver on the first positioning device, wherein the connection is between the first positioning device and a second positioning device in the set of positioning devices;
issuing, in direct and automatic response to the detecting of the connection, a human-perceptible connected indicator from the first positioning device;
determining a position value for an object using a set of signals transmitted from a subset of positioning devices in the set of positioning devices;
determining a position value for the first positioning device using a second set of signals transmitted from the subset of positioning devices;
determining a first distance value using the position value of the object and the position value for the first positioning device;
determining a second distance value from the object to the first positioning device using a signal transmitted from the first positioning device; and
detecting an unconnected state by evaluating the first distance value and the second distance value.

27. A non-transitory computer-readable medium storing instructions for executing a method, wherein the method comprises:
issuing a human-perceptible unconnected indicator from a first positioning device in a set of positioning devices;
detecting a connection using a wireless receiver on the first positioning device, wherein the connection is between the first positioning device and a second positioning device in the set of positioning devices;
issuing, in direct and automatic response to the detecting of the connection, a human-perceptible connected indicator from the first positioning device;
determining a position value for an object using a set of signals transmitted from a subset of positioning devices in the set of positioning devices;
determining a position value for the first positioning device using a second set of signals transmitted from the subset of positioning devices;
determining a first distance value using the position value of the object and the position value for the first positioning device;
determining a second distance value from the object to the first positioning device using a signal transmitted from the first positioning device; and
detecting an unconnected state by evaluating the first distance value and the second distance value.

28. A positioning system comprising:
a first positioning device with: (i) a wireless receiver; (ii) a means for issuing a human-perceptible unconnected indicator; (iii) a means for issuing a human-perceptible connected indicator; and (iii) a memory; and
a second positioning device;
wherein the memory stores instructions to:
   detect a connection between the first positioning device and the second positioning device via the wireless receiver;
   automatically issue the human-perceptible connected indicator in direct response to detecting of the connection;
   determine a position value for an object using a set of signals transmitted from a subset of positioning devices in the positioning system;
   determine a position value for the first positioning device using a second set of signals transmitted from the subset of positioning devices;
   determine a first distance value using the position value of the object and the position value for the first positioning device;
   determine a second distance value from the object to the first positioning device using a signal transmitted from the first positioning device; and
   detect an unconnected state by evaluating the first distance value and the second distance value.

29. The method of claim 26, further comprising:
- issuing a second human-perceptible unconnected indicator from a second positioning device in the set of positioning devices;
- wherein the positioning system exclusively identifies a failure to provide an adequate connection between the first positioning device and the second positioning device using the human-perceptible unconnected indicator and the second human-perceptible unconnected indicator.

30. The non-transitory computer-readable medium of claim 27, wherein the method further comprises:
- issuing a second human-perceptible unconnected indicator from the second positioning device in the set of positioning devices; and
- exclusively identify a failure to provide an adequate connection between the first positioning device and the second positioning device using the human-perceptible unconnected indicator and the second human-perceptible unconnected indicator.

* * * * *

UNITED STATES PATENT AND TRADEMARK OFFICE
CERTIFICATE OF CORRECTION

PATENT NO. : 10,969,468 B2
APPLICATION NO. : 16/049097
DATED : April 6, 2021
INVENTOR(S) : Colafrancesco et al.

It is certified that error appears in the above-identified patent and that said Letters Patent is hereby corrected as shown below:

In the Specification

Column 11, Line 13, replace "$|\hat{\mathbf{r}}_j - \mathbf{r}_k| \sim d_{k,j}$" with --$|\hat{\mathbf{r}}_j - \mathbf{r}_k| \approx d_{k,j}$--.

In the Claims

Claim 30, Column 19, Line 16, replace "exclusively identify a failure" with --exclusively identifying a failure--.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*